Aug. 1, 1961 T. A. HARTMAN 2,994,493
CHANNELLED FAN AIRCRAFT
Filed Oct. 23, 1957 2 Sheets-Sheet 1

Thomas A. Hartman
INVENTOR.

Aug. 1, 1961    T. A. HARTMAN    2,994,493
CHANNELLED FAN AIRCRAFT
Filed Oct. 23, 1957    2 Sheets-Sheet 2

Thomas A. Hartman
INVENTOR.

BY Clarence A. O'Brien
and Harvey B. Jackson
Attorneys

United States Patent Office 2,994,493
Patented Aug. 1, 1961

2,994,493
CHANNELLED FAN AIRCRAFT
Thomas A. Hartman, Anaheim, Calif.
(700 Capac Court, St. Louis 25, Mo.)
Filed Oct. 23, 1957, Ser. No. 691,909
6 Claims. (Cl. 244—12)

This invention relates to heavier than air aircraft, and particularly to aircraft which have the propulsion producing stream at least partially within a channel or duct.

There seems to be no question of the phenomenal static lift achieved by mounting an aircraft propeller in a channel. A number of patents have been granted to Willard R. Custer, who is thought to have provided vast steps in this art. These patents described numerous advantages of channeled wing aircraft.

As far as I can determine, the only real objection to and deterrent for the adoption of the ducted wing, is that greater stability is presently considered to be essential. My invention concerns itself with this problem and is embodied in an aircraft employing a partial ducted-fan fuselage. The wing of my aircraft is a lift producing medium, but the fuselage contributes an extraordinary proportion of the total lift. The wing is desirable because it provides an area for ailerons that are necessary for maneuverability. The wing is located near the aft of the fuselage channel and hence, near the aft of the airplane. This is to locate the center of pressure for the entire airplane at an optimum position and in order to achieve both longitudinal and directional stability. Roughly, the first third of the fuselage is designed principally to provide a smooth and accelerated flow of air into the channel or duct, and secondarily to provide lift. The aft two-thirds of the fuselage is made principally of the channel which is about 25% narrower at the rear than it is at its front. The purpose of this is to restrict and accelerate the mass flow and provide both lift and stability. The formation of the channel is such that it terminates in rather sharply slanted fins which separate the mass flow through the channel from the areas of different pressure which exist on the outside of the duct.

The power plant, either propeller or jet or a combination of both, is mounted in the duct and more particularly, within the confines of the fins which comprise the sides of the duct. The power plant, if of the propeller type, could be either a pusher or a traction configuration.

The object of this invention is to provide a channel-type aircraft whose design and novel arrangement of airfoils, control surfaces and power plant, contributes to a very slow permissible air speed in a power-on condition and affords satisfactory stability at all speeds and particularly, positive control at the very low speeds.

Other objects and features of importance will become apparent in following the description of the illustrated form of the invention.

Figure 1:
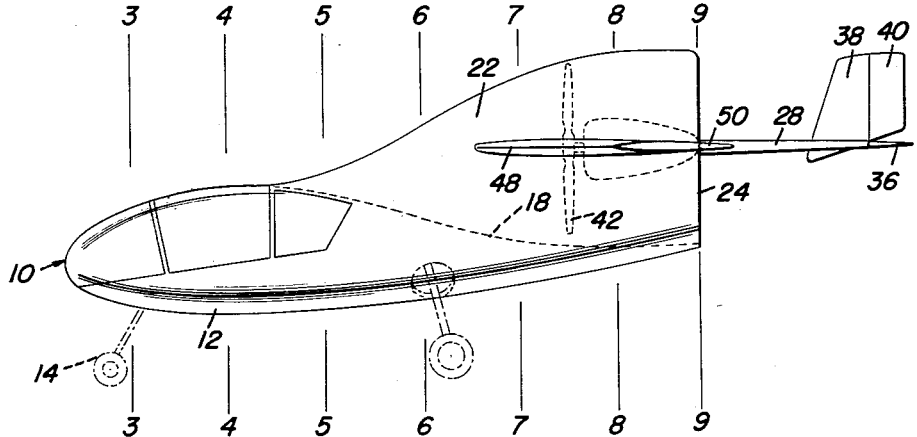
FIGURE 1 is an elevational view of an aircraft which embodies the principles of the invention.
Figure 2:
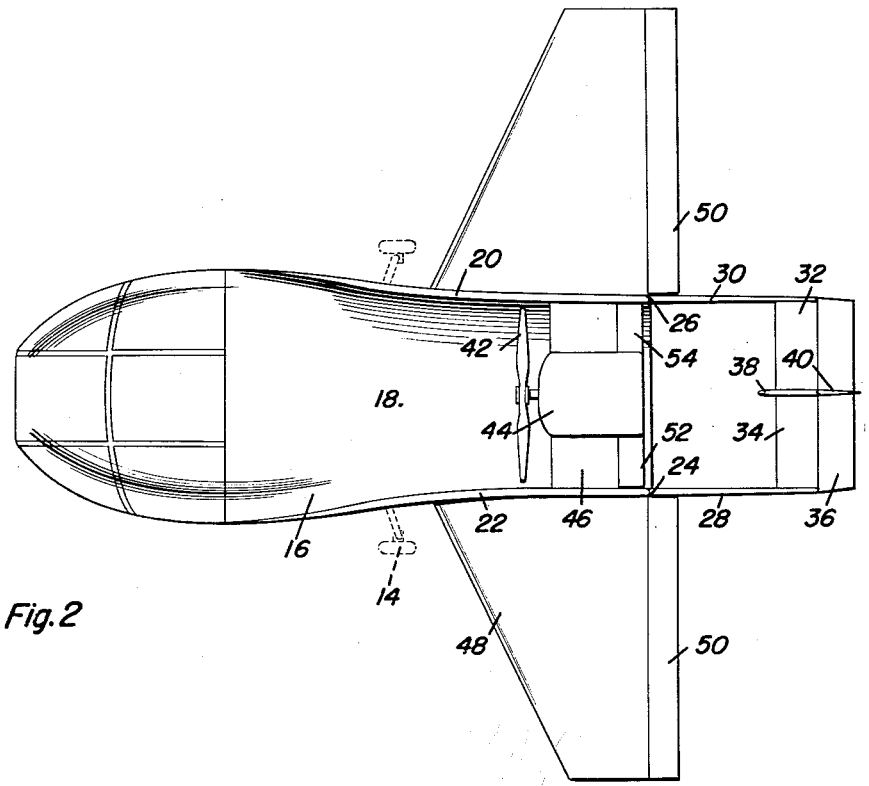
FIGURE 2 is a top view of the aircraft in FIGURE 1.
Figure 3:
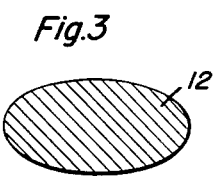
FIGURE 3 is a sectional view taken at the station 3—3.
Figure 4:
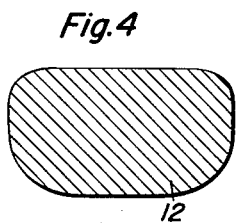
FIGURE 4 is a sectional view taken at the station 4—4.
Figure 5:
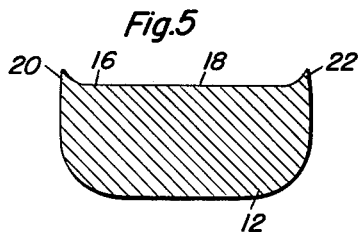
FIGURE 5 is a sectional view taken at the station 5—5.
Figure 6:
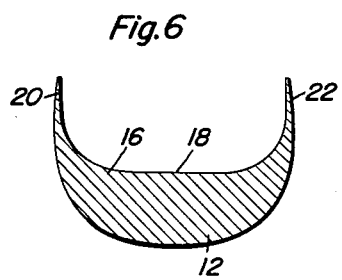
FIGURE 6 is a sectional view taken at the station 6—6.
Figure 7:
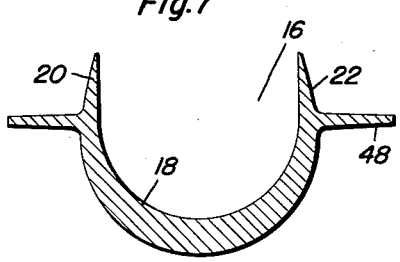
FIGURE 7 is a sectional view taken at the station 7—7.
Figure 8:
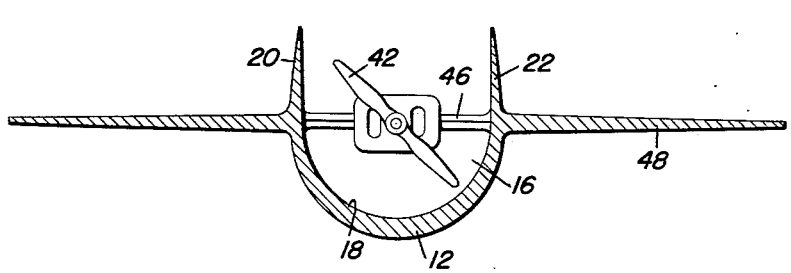
FIGURE 8 is a sectional view taken at the station 8—8 and showing the power plant in elevation.
Figure 9:
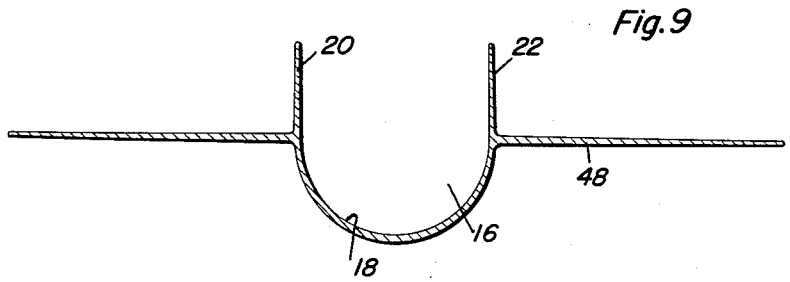
FIGURE 9 is a sectional view taken at the station 9—9.

In the accompanying drawings I have illustrated an airplane 10 with a fuselage 12 and schematically represented tricycle landing gear 14. Other landing gears could be used and I specifically contemplate hydroskis and floats. Fuselage 12 is shaped to provide a lift when the airplane is in forward flight. The cross sections of FIGURES 3-5 show a typical such fuselage. The upper surface of the fuselage at its nose, is smoothly curved in longitudinal section and as seen in FIGURE 1, the side view of the fuselage resembles the section of an airfoil. Air passing over the fuselage is accelerated and imparts lift due to the airfoil shape of the fuselage. The airflow is further accelerated and additional lift is imparted to it by being confined within duct or channel 16. The lower wall or surface 18 of channel 16 commences at approximately the 30% station in the aircraft and declines in a direction toward the aft end of the fuselage. While so declining, the bottom surface or wall 18 assumes an arcuate (in cross section, FIG. 7) shape. The side walls of channel 16 are constituted by a pair of fins 20 and 22 which are identical for the left and right side of the fuselage. These fins are smoothly faired at their beginning (FIG. 5) and rise gently to a maximum height at about the 90% station of the fuselage. Then they follow a straight or substantially straight line to the shear rear edges 24 and 26 of each. At about the middle of channel 16 the fins or sides 20 and 22 of channel surface 18 merge so that in this region of the channel it is approximately 75% or 80% of the width at the front end of the channel. This is so that the mass flow through the channel is accelerated before discharging at the open end of the upwardly opening channel 16.

In the illustrated configuration I have twin booms 28 and 30 extending from the side walls 20 and 22 of channel 16. The booms support an empenage 32 constructed of a horizontal stabilizer 34, elevator 36, vertical stabilizer 38 and rudder 40. The vertical stabilizer 38 and rudder 40 are on a longitudinal center line of the aircraft and are in the slip stream. Horizontal stabilizer 34 and elevator 36 are located between the booms 28 and 30 and are also located in the slip stream from the engine driven propeller 42 and the wash from the mass flow through channel 16.

Engine 44 is on a motor mount 46 which may have a strut configuration inasmuch as it extends transversely across channel 16. Wing 48 has left and right sections on opposite sides of the fuselage. A structural advantage can be obtained by uniting the motor mount with the main wing spars or in some way structurally connecting them. A tractor-type propeller 42 is driven by the shaft of the engine and is located within the duct 16 closer to the aft discharge end than the air entrance of the duct.

Ailerons 50 are at the trailing edge of the wing 48 and supplemental ailerons or vanes 52 and 54 are connected to the trailing edge of the motor mount 46. Operation of vanes 52 and 54 is coupled with the actuation of the ailerons.

Tests have shown that an aircraft constructed as described and shown possesses phenomenal static lift and is both longitudinally and laterally stable throughout its speed range. It is difficult to reconcile the seemingly amazing behavior of channeled wing aircraft with the mathematical approach to aerodynamic characteristics. As indicated previously I believe that the very slow air speed possible when power is used is due to the fact that the air passing over the fuselage (in my airplane) is accelerated and imparts lift due to the airfoil shape of the fuselage. Secondly, the airflow is further accelerated and additional lift imparted by being confined within the narrowing sides 20 and 22 of the duct or channel 16. Third, as the mass of accelerated air approaches the propeller disk it becomes part of the inflow velocity of air to the propeller.

This inflow velocity is generally about 30% of the velocity of the slip stream, however, in this case it would be higher because of the confined air mass due to the shape and actual presence of channel 16. At low speeds this would cause a region of considerable lift, at high speeds a region of negligible lift. The inflow velocity would also serve as a boundary layer control during low speeds and would prevent the fuselage from stalling until a very low speed is reached. In a stall, this region would be the last to stall and because of its location, would break the stall by virtue of it being a center of pressure of the airplane.

Satisfactory stability is achieved at these low air speeds, and the stability problems encountered have been primarily ones of longitudinal stability. The problem of stability centers largely about longitudinal stability in ducted wing aircraft. As the air speed increases and the angle of attack decreases, the center of pressure for wing 48 and fuselage 12 will move forward from its normal position. However at low speeds the area of inflow of velocity, ahead of the propeller disk and behind the normal center of pressure for the airplane 10, will become a region of considerable lift and when combined with the forward moving center of pressure will produce a new center of pressure that will be comparatively stationary with varying air speeds.

It is important to have effective control at these very low speeds, this being a problem which "automatically" solves itself in ordinary aircraft design because landing speeds are very much greater than landing speeds in aircraft of the type with which the invention deals. The low speed control is achieved by the propeller blast at the rear of channel 16. The empennage is located in this high speed stream and therefore capable of exerting additional directional control even though the aircraft is being propelled at a low speed. Moreover, the vanes 52 and 54 provide for a definite deflection which is otherwise unobtainable.

Although the illustration is for one configuration it is understood that various others may be made without departing from the scope of the appended claims. For example the elevator could be made into an elevon by splitting it and thereby providing lateral as well as longitudinal control from these same services. This could supplement the ailerons at low speeds and would make coordinated turns possible at low speeds without aileron deflection and the resulting drag on the down aileron wing and loss of lift on the up aileron wing. Control effectiveness would be available past a stall in view of the location of the empenage and the presence of vanes 52 and 54. Moreover, the design need not be restricted to a twin boom organization. A single boom may be used or, a flying wing-type aircraft using no booms could be adopted. Such usual expedience as flaps and slots are applicable in my aircraft. The U or channel shaped duct which surrounds the propeller and engine may be continued to form a barrel shaped construction around the propeller and engine. This may be necessary to overcome propeller vibration caused by varying the airstream velocities. Elevator controls could be located in front of the wing as in canard type aircraft.

Having described the invention what is claimed as new is as follows:

1. In an airplane, a fuselage, a channel operatively connected with the aft end of the fusealge and opening upwardly, the air entrance end of said channel located behind the front end of the fuselage, propulsion means for the airplane located in said channel, said channel having a bottom wall with the highest point at the front thereof and smoothly curved downward and rearward, upwardly extending fins rising from said fuselage and constituting side walls of said channel, the width of said channel being greater at the entrance end thereof than a station downstream of said entrance end of said channel and in the region of said propulsion means, the rear edges of each of said channel side walls being straight and of a substantial height, a boom extending rearwardly from said channel side walls and vertically positioned between the top and bottom of said edges, and an empennage carried by said boom.

2. The airplane of claim 1, wherein said empennage includes control surfaces for directionally controlling the airplane located in the slip stream of the channel.

3. The airplane of claim 2, wherein there is at least one wing having semi-spans attached at their root ends to said channel sides to approximately the level of said boom and propulsion means, the leading edge of said wing being located behind the inlet end of said channel.

4. In an airplane, a fuselage shaped to produce airfoil lift thereof, channel means formed on said fuselage and disposed longitudinally and rearwardly of said fuselage and having rearwardly narrowing sides to further accelerate airflow over the fuselage to provide additional lift therefor, propulsion means mounted within said channel means intermediate the longitudinal disposition of said channel means and thereby operative to provide high lift during low air speeds for said fuselage rearwardly of its center of gravity, airfoil wings mounted on the sides of said channel means and disposed longitudinally along said channel means and rearwardly therebeyond, whereby the combined lift on the wings and fuselage will determine a center of lift pressure, for all air speeds, so as to maintain longitudinal stability of the airplane at low air speeds.

5. The airplane as defined in claim 4, wherein the propulsion means and wings are commonly supported on the sides of said channel means.

6. The airplane as defined in claim 4, further including a tail assembly supported from the sides of said channel means and located to the rear thereof.

References Cited in the file of this patent

UNITED STATES PATENTS

| | | |
|---|---|---|
| 1,880,520 | Stout | Oct. 4, 1932 |
| 2,514,478 | Custer | July 11, 1950 |
| 2,532,481 | Custer | Dec. 5, 1950 |
| 2,730,311 | Doak | Jan. 10, 1956 |
| 2,893,661 | Aylor | July 7, 1959 |
| 2,940,688 | Bland | June 14, 1960 |

FOREIGN PATENTS

| | | |
|---|---|---|
| 593,032 | Great Britain | Oct. 7, 1947 |
| 719,406 | Germany | Mar. 12, 1942 |